United States Patent [19]

Minks

[11] Patent Number: 5,202,811

[45] Date of Patent: Apr. 13, 1993

[54] ELECTRICAL POWER SYSTEM WITH HIGH VOLTAGE PROTECTION RESPONSIVE TO PLURAL CONTROL VOLTAGES

[76] Inventor: Floyd M. Minks, 2700 Partin Settlement Rd., Kissimmee, Fla. 32743

[21] Appl. No.: 569,924

[22] Filed: Aug. 20, 1990

Related U.S. Application Data

[63] Continuation of Ser. No. 311,071, Feb. 14, 1989, abandoned.

[51] Int. Cl.⁵ .............................................. H02H 3/20
[52] U.S. Cl. ........................................ 361/56; 361/91; 361/18; 320/59
[58] Field of Search ................ 361/91, 56, 18; 320/59, 320/39, 25

[56] References Cited

U.S. PATENT DOCUMENTS 4,458,195  7/1984  Piteo ..................................... 320/59
4,791,349  12/1988  Minks .................................... 320/25

Primary Examiner—Todd E. DeBoer
Attorney, Agent, or Firm—Duckworth, Allen, Dyer & Doppelt

[57] ABSTRACT

Disclosed is an electrical power system adapted to receiving power from a source of alternating current, typically a small alternator and supplying a direct potentially to a load. This power system contains protective circuits which control or shut off a portion or all of the electrical power system in response to abnormally high or low voltage conditions. The high voltage protection circuit short circuits the alternator in response to abnormally high load voltage. A second high voltage sensing circuit, locks out the main regulation and rectification circuit for a selected period of time after the over voltage sensing point is exceeded. The low voltage protection circuit abruptly reduce output to zero once the output voltage decreases to a minimum level. This voltage then remains at zero until the circuit is reset by an external signal.

4 Claims, 3 Drawing Sheets

| | | | |
|---|---|---|---|
| R1 | 30K | Z1 | IN962 |
| R2 | 330K | Z2 | IN971 |
| R3 | 150K | Z3 | IN957 |
| R4 | 3.9K | C1 | .1MF |
| R5 | 15K | C2 | .1MF |
| R6 | 2.4K | Q1 | MPSA92 |
| R7 | 10 MEG | Q2 | MPSA92 |
| R8 | 5 MEG | Q3 | J230 |
| R9 | 221 | Q4 | MPSA92 |
| R10 | 270 | Q5 | MPSA92 |
| R11 | 1K | Q6 | 2N2222 |
| R12 | 24K | SCR1 | 2N6508 |
| R13 | 150 | SCR2 | 2N6508 |
| R14 | 1.2K | | |
| R15 | 1.2K | | |
| R16 | 680 | | |
| D1 | IN4004 | | |
| D2 | IN4004 | | |
| D3 | IN4148 | | |
| D4 | IN4148 | | |
| D5 | IN4148 | | |
| D6 | IN4004 | | |
| D7 | IN4148 | | |
| D8 | IN4148 | | |

FIGURE 3

ELECTRICAL POWER SYSTEM WITH HIGH VOLTAGE PROTECTION RESPONSIVE TO PLURAL CONTROL VOLTAGES

This is a continuation of application Ser. No. 07/311,071, filed Feb. 14, 1989, now abandoned.

BACKGROUND OF THE INVENTION

1. Field of the Invention

This invention relates to a rectifier regulator system adapted to receive power from a source of AC power such as a permanent magnet or rotating field alternator and supplying direct current to a load such as a battery and vehicle electrical system. This regulator contains components for supplying the usual functions for rectifying the AC power and controlling the output voltage to the battery or the load. In addition components are included to prevent the application of dangerous and destructively high voltages to the output lead in the case where the battery or other load is intermittently or permanently opened with the system operating. In addition circuitry is included to turn off an auxiliary output in the event that the load voltage drops below a selected level thus preventing failures of load items which may be damaged by operation with abnormally low voltage applied.

2. Description of Prior Art

Many systems for rectifying the output of an alternator and controlling the charging of the battery are known in the art. An example would be applicant's U.S. Pat. No. 4,791,349. Some prior art circuits have included protection to prevent high voltages from appearing at the battery terminals if the battery is open circuited. Typically in the prior art this has included electronic means to short circuit the source of AC power for the entire time that the battery is, open thus requiring high current components and large heat sinks. In some other prior art circuitry if the battery is completely open and the voltage goes to zero, no power is available to turn on the components that normally allow and control the flow of power to the load. Thus after the first alternator cycle no power is dissipated in the shunt device. This type of circuitry in the prior art while eliminating the need for the large heat sink, however, will fail very quickly if the battery is at an intermediate state between normal characteristics and open circuit.

Also known in the art are systems such as described in applicant's U.S. Pat. No. 4,664,080 for limiting the speed of an internal combustion engine by removing the ignition in response to certain operating or signal conditions. Such systems may receive a portion of their power or a signal from the vehicle battery system such as is charged by the electric power system of the present invention. Under certain conditions of abnormally low battery voltage such as could be created by internal short circuits in the battery, speed limiting apparatus of the type or functional equivalent of that described in the above mentioned U.S. Pat. No. 4,664,080 may produce erratic turning on and off of the ignition, thus creating back firing in the engine which in some engine types could cause severe engine damage. An auxiliary output on the circuit of this present invention is intended to be connected to the input of such speed limiting apparatus, completely turning off such apparatus under abnormally low battery voltage conditions.

The objects and purposes of this invention are as follows:

(1) To produce a simple, light, inexpensive and highly efficient system to rectify and regulate the output of an alternator and produce direct current suitable for recharging a battery or operating the electrical system of a vehicle, and to include in that system means for sensing an intermittent or complete open circuit or partial open circuit of the battery and in response to that condition to turn off the output of the regulator and prevent the creation of abnormal voltages at the battery terminals.

(2) To perform the functions in 1 above without the necessity of large heat sinks or continually conducting the maximum output of the AC source through components within the regulator when the battery circuit is open or intermittently open.

(3) To provide an auxiliary output of the regulator with the voltage at the auxiliary output being abruptly reduced to zero when the voltage of the battery goes, even momentarily, below a predetermined, abnormally low limit.

SUMMARY OF THE INVENTION

This invention relates to an electrical rectification and regulation system. A alternator or other source of alternating current electrical energy provides the input power. A first controllable rectification unit such as a silicon control rectifier selectively allows energy to pass from that source of AC to a direct current load such as a battery. A means of sensing the voltage on the battery and selectively energizing the gate or control electrode of the rectification unit is included. Also included is a second electronic switch means connected effectively across the source of AC power and responsive to a first abnormally high, instantaneous voltage across the battery terminals. Also a portion of the invention is a long time constant peak detecting circuit, sensitive to voltages above the normal battery voltage, but below the first abnormally high voltage. The output of that long time constant circuit is used to lock off the first controllable rectification unit. Also as part of the invention is optionally included an output circuit for driving a tachometer or similar speed measuring device requiring a rectangular waveform. Also included in the invention is an auxiliary output circuit which provides output voltage only provided the load voltage remains above a preselected level, reducing that voltage to zero if the load voltage drops below the preselected level and maintaining that voltage at zero until that circuit is reset from an external signal source.

BRIEF DESCRIPTION OF THE DRAWINGS AND THE APPENDIX

Figure 2:
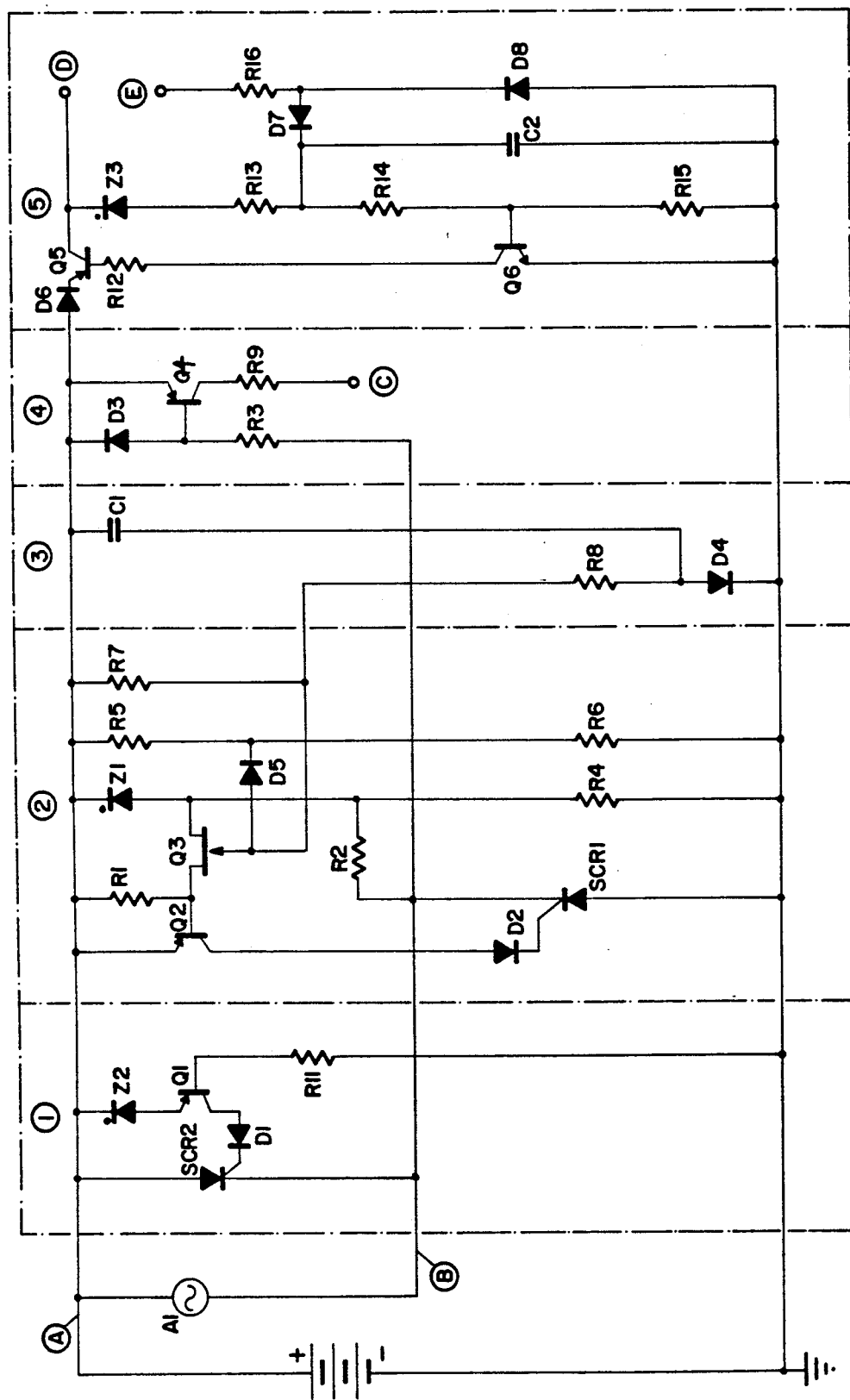
FIG. 2 is an electronic circuit diagram of a preferred embodiment of the present invention. Components corresponding to the functional blocks in FIG. 1 are numbered with the same numbers used in FIG. 1.

The accompanying appendix is a parts list with component values or known industry standard types shown corresponding to the labeling of parts in FIG. 2. The value shown will be typical for a system connected, for instance on an outboard motor to a permanent magnet alternator capable of supplying 15 amps charging current to a 12 volt DC battery. These values are given only to aid in the understanding of the operation of this circuit and are not to be considered to be limiting to the adaptations of the circuit which can be made by someone skilled in the state of the art. For example, in the circuit diagrams and the detailed descriptions that follow, where for instance a bipolar transistor is shown, one skilled in the art may substitute many electrical amplifying devices such as junction or insulated gate field effect in lieu there of transistors. The same will be true when a silicon control rectifier is shown. Where one skilled in the art may substitute other controllable rectifying and switching devices.

DETAILED DESCRIPTION OF THE PREFERRED EMBODIMENT

Figure 1:
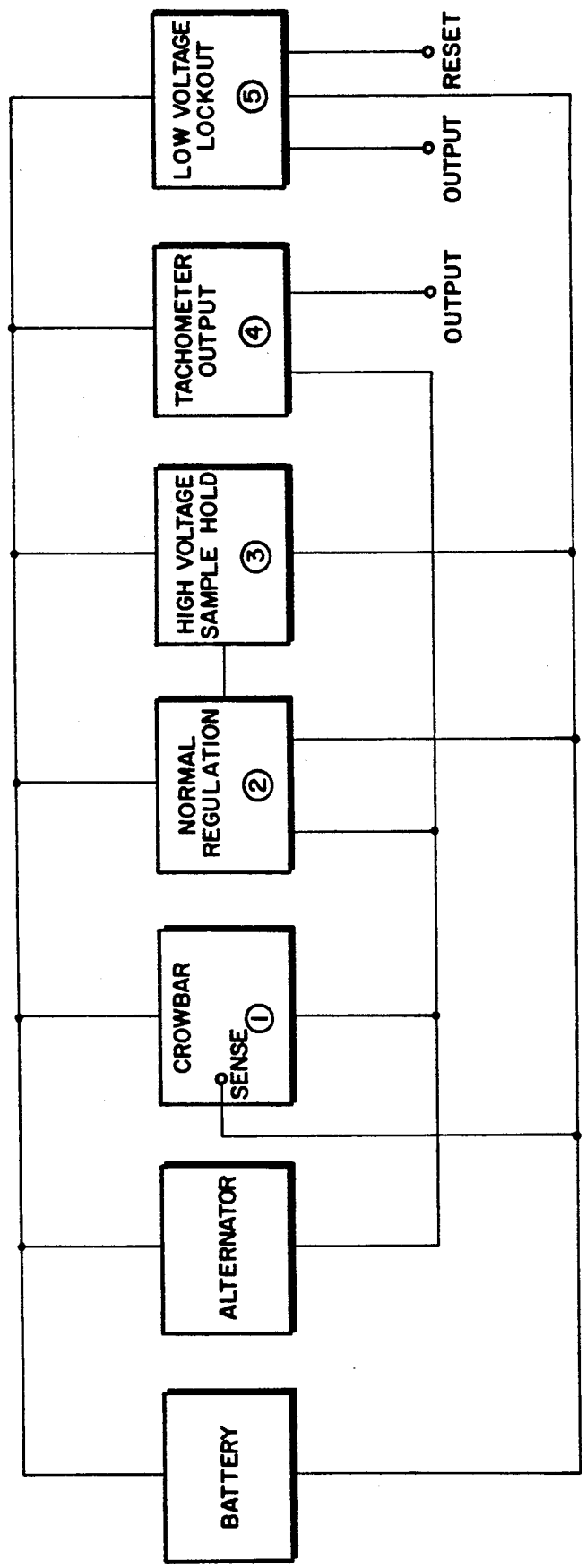
FIG. 1 is a block diagram of a preferred embodiment of this invention. This block diagram includes descriptions of the functional blocks and numbers 1-5 assigned to those functional blocks.

Section number 2 in both FIGS. 1 and 2 correspond generally to the functions in the components in FIG. 4 of applicant's U.S. Pat. No. 4,791,349. The understandings of the teachings of that patent is assumed by reader. The components in blocks 1, 3, 4 and 5 could therefore be omitted and the circuitry in block 2 together with the alternator and load would function as a regulator rectifier but without the high and low voltage protection described as an object of this invention. SCR1 is connected in series with the source of alternating current power shown as A1 and a direct current load shown as a battery. Other external loads of course could be connected across the battery and the battery could be replaced by a large capacitor. The flow of current from the alternator to the load is enabled by gate current to the SCR, flow of gate current is controlled by transistor Q2 in series with resistor R10 and diode D2. Diode D2 prevents reverse voltages from being supplied to transistor Q2 during the half of the AC cycle when SCR1 is reversed biased. Resistor R10 prevents excessively high currents and therefore dissipations through Q2 when the output voltage is below the set regulation level even when SCR1 is turned on and therefore conducting. Resistor R1 is connected from the emitter to the base of Q2 to minimize the effect of leakage current, particularly at high temperature. Zener diode Z1 is the voltage reference for this regulator. Under normal operation, the major portion of the current through this reference is supplied through resistor R4. Under initial start up conditions if the battery voltage is zero, sufficient current can come from the alternator AC through resistor R2 to start the system. Thus, this regulator system is capable of being started with the battery or load at zero voltage. Transistor Q3 shown as a junction field effect transistor controls the base drive to transistor Q2 with respect to the reference voltage across Zener diode Z1. As is known, this device is normally in the conducting mode and rendered nonconductive by negative voltage on the gate with respect to the source which is connected to the anode of Z1. A diode D5 is forward biased by a relatively low current supplied by resistor R7. The voltage across D5 also serves as a portion of the reference voltage, compared to the junction of resistors R5 and R6 which are series connected directly across the battery or load. Diode D5 serves the additional functions of compensation for the down temperature coefficients of Z1, and Q3 and preventing the discharge of C1, through the voltage divider R5, and R6. Thus the relatively fixed voltages established by Zener diode Z1, the gate source voltage of Q3 and the forward bias voltage of D5 are compared by the circuit with a portion of the battery voltage selected by the ratio of R5 to R6. One skilled in the art will see that the phasing is such that an increase in battery voltage above the desired level will apply a negative voltage to the gate of Q3, thus turning Q3 off, which will in turn, turn Q2 off, which will in turn, remove the gate drive from SCR1, preventing the flow of further current from A1 to the battery or load. The values shown in FIG. 3 were chosen to give a approximately zero temperature coefficient with addition of the known characteristics of Z1, Q3 and D5. This produces a stable output voltage with temperature. Alternatively in situations where a predictable change in output voltage with temperatures is desired, such as in some lead acid battery charging applications where it is desireable to reduce the terminal voltage as temperature increases the values of the semiconductors previously mentioned could be changed or alternatively a known temperature coefficient resistor could be substituted for R5 or R6. This circuit is particularly desirable for that adaptation because of the high impedance of the gate of Q3, thus allowing relatively high value resistors to be used for R5 and R6, minimizing the internal heating and therefore drift of value if non zero temperature coefficient parts are used. The value shown in the appendix will give a output regulation voltage of approximately 14 volts typical of a 12 volt lead acid battery under charge.

Block 1 and FIG. 1 is a peak sensitive over voltage protection circuit. Circuitry of this general type is sometimes called a crow bar circuit. These components short circuits the alternator in response to excessive voltage across the battery terminals. It should be stressed that this differs from the conventional crow bar circuit and that the conventional circuit senses the voltage across the same points that the short circuit is applied, the circuit in block 1 senses the voltage across a different circuit, that is the battery, from the circuit that is shorted, circular clamp that is the alternator. When the voltage across the battery exceeds a preset limit, establish primarily by Z2. With minor contributions from the base emitter saturation of Q1 and the drop across R11, current is conducted through Z2, Q1 and D1 into the gate of SCR2 thus turning on SCR2 and reducing the voltage across alternator A1 to essentially 0 for the remainder of that half cycle. The response of these components is extremely fast (in the micro second range). However if no other components were present and the battery was open circuited the SCR2 would have to have a steady state current capability equalling the short circuit current output of the alternator A1. This would typically be between 1 and 2 times the output battery charging capability of A1, thus requiring an extensive heat sink on SCR2. If however only a single cycle out of every several hundred cycles must be short circuited by SCR2 then will normal and practical components the peck current capability of SCR2 becomes the limiting factor and no heat sinking other than that associated with the case itself or SCR2 is required. Diode D1 prevents reverse gate current in SCR2 or reverse voltage application to transistor Q1 during the portion of the alternator waveform when SCR1 annode is negative compared to its cathode. Resistor R11 prevents destructive currents from flowing in transistor Q1 if the battery polarity is in reversed from incorrect connection of jumper cables or other similar happenings. Resistor 11 can also prevent excessive dissipation and transistor Q1 and zener Z2 resulting from a partial short circuit of the winding of alternator A1 to ground. A typical voltage for zener Z2 might be 200% of the nominal battery charging voltage or approximately 28 volts in a nominal 12 volt system.

In FIGS. 1 and 2 reference numeral 3 can be described as sample and hold circuitry with a time constant long compared to the period of the alternator A1. Diode D4 charges capacitor C1 to nearly that peak voltage appearing across the battery terminals. The time constant of capacitor C1 and resistor R8 is chosen to be many times (normally many hundreds of times) the period of the alternator. Resistor R8 together with R7 produce a voltage divider. The ratios in the resistor divider consisting of R5 and R6 compared to the ratio of the resistor divider consisting of R7 and R8 is such that under normal operation the junction of R7 and R8 is positive with respect to the junction of R5 and R6. The resistance of R7 and R8 are normally much higher than the resistors R5 and R6 thus under normal operation a small current flows through resistor R7 and diode D5 and has very little effect on the voltage at the center of the divider compressing R5 and R6. This is the normal condition with the output at its designed approximately 14 volts. If however because of a internal battery failure or a loose battery cable the battery cannot absorb the peak current out of the alternator A1 when SCR1 is turned on, C1 will charge to a level that will turn off Q3 for not only the remaining portion of the alternator cycle when the peck occurs, but for many hundreds of cycles thereafter. The methods of analyzing these time constants and divider ratios is well known in the art will not be described here further. The voltage where this turn off of Q3, caused by the peak voltage detected and stored on C1, occurs would normally be chosen in this invention to lie between the maximum normal charge voltage to the battery and the set voltage of circuit 1, that is primarily the voltage of Z2. Thus a voltage somewhere between 15 and 27 would be appropriate for the example values given herein for illustration purposes. Thus if the load or battery terminal is opened with the system operating, when SCR1 next turns on the voltage to the load would start to raise rapidly. This would charge capacitor C1 as the voltage. When the voltage reaches the voltage that can turn on SCR2, as previously described, the remainder of that half cycle would be shorted. The peak voltage retained on capacitor C1 would turn off transistor Q3. As previously described no gate signal will be supplied to SCR1 for subsequent cycles, typically for several seconds. During that several seconds no current will flow through SCR2. When C1 has discharged through R8 and the associated components to a level where Q3 could again turn on SCR1 may again turn on. If the battery or load circuit still remand open the sequence just described would repeat. If the battery is not still open normal operation will automatically resume. Thus SCR2 is required to short only one cycle every several seconds. One skilled in the state of the art can adapt the various divider ratios and time constants, or in more general terms the entire unique operating sequence disclosed here into a wide range of specific voltage or other requirements.

FIG. 1 and FIG. 2 reference 4 is a tachometer output circuit. Resistor R3 connects the base of transistor Q4 directly to the alternator A1. During one half of the alternator cycle, transistor Q4 is biased on allowing the flow of currant from the battery plus lead through Q4 and the currant limiting resistor R9 to the tachometer output labeled as C. Resistor R9 can be chosen to prevent the burn out of transistor Q4 even if lead C is inadvertently grounded. Diode D3 prevents the application of destructive reverse voltages to the base emitter junction of transistor Q4 during the half of the cycle when transistor Q4 would be non conducting. The slight reverse bias created be the forward voltage drop of D3 reduces the leakage currant on the collector of Q4 to extremely low levels, thus eliminating the need for a resistor from point c to ground. Thus the output of this tachometer circuit at point c is a rectangle waveform going from 0 to the battery plus voltage. This voltage does not vary with the alternator voltage, and therefore speed, and may therefore be connected to tachometers which would be damaged if connected directly to the alternator lead at point B. Diode D3 in conjunction with current limiting resistor R9 can also be seen by one skilled in the art to protect the components in block 4 from the effects of a reversed battery voltage. In a similar manner diode D2 and resistors R4 and R6 will protect components in Block 2 from reverse battery conditions.

In FIG. 1 and FIG. 2 reference numeral 5 refer to a low voltage protection circuit. This circuit receives its main power input from the battery plus lead through diode D6 thus protecting the remainder of the circuitry from possible reverse battery installation. A control signal input is received on the terminal marked E. This might typically be connected to the starter motor armature or starter solenoid or other source that is energized upon starting the engine to which this electrical system may be attached. The output of this circuit is at reference letter D. This could typically be connected to circuitry, such as a speed sensitive ignition interruption circuit, that might cause failure of the circuit or the engine to which it is attached if operated from a voltage below a arbitrarily selected level. The functioning of the circuit is as follows: An input positive signal at point E allows current to flow through resistor R16 and diode D7 and resistor R14 and the base emitter junction of transistor Q6 thus turning on transistor Q6. This input pulse must be of sufficient duration to turn on transistor Q6 in the presence of the time constance associated with R14, R16 and C2. Thus C2 maybe selected by one skilled in the art to prevent turn on of the transistor Q6 and therefore this circuit block from short duration noise that may be associated with the unshielded wire frequently used in engine installations. If point E is connected directly to the starter armature, or other inductive source, a large negative tangent will be produced when the starter motor is deenergized. Diode D8 will allow a path for the flow of this reverse current thus preventing a high reverse voltage and possible breakdown of diode D7. When transistor Q6 is turned on as just described current will flow from the battery plus through diode D6 and the base emitter junction of transistor Q5 and resistor R12 thus turning on transistor Q5. The current will primarily be controlled by resistor R12 which maybe selected to prevent the destruction of transistor Q5 if the output, reference point D, is shorted to ground. When transistor Q5 is turned on, as previously described, it will remain on as long as its collector voltage is higher than the breakdown voltage are zener diode Z3, plus the drops that may be computed for the selected values of resistors R13, R14, and R15. R13 prevents high transient charging currents through zener diode Z3 charging capacitor C2. Alternatively the output D of the low voltage protection circuit could be connected back to a point such as supplying the emitter current for transistor Q2. That would shut down the entire regulator below the voltage selected by the combination of zener diode D3 and resistors R13, R14, and R15.

APPENDIX

| | |
|---|---|
| R1 | 30K |
| R2 | 330K |
| R3 | 150K |
| R4 | 3.9K |
| R5 | 15K |
| R6 | 2.4K |
| R7 | 10 MEG |
| R8 | 5 MEG |
| R9 | 221 |
| R10 | 270 |
| R11 | 1K |
| R12 | 24K |
| R13 | 150 |
| R14 | 1.2K |
| R15 | 1.2K |
| R16 | 680 |
| D1 | IN4004 |
| D2 | IN4004 |
| D3 | IN4148 |
| D4 | IN4148 |
| D5 | IN4148 |
| D6 | IN4004 |
| D7 | IN4148 |
| D8 | IN4148 |
| Z1 | IN962 |
| Z2 | IN971 |
| Z3 | IN957 |
| C1 | .1 MF |
| C2 | .1 MF |
| Q1 | MPSA92 |
| Q2 | MPSA92 |
| Q3 | J230 |
| Q4 | MPSA92 |
| Q5 | MPSA92 |
| Q6 | |
| SCR1 | 2N6508 |
| SCR2 | 2N6508 |

I claim:

1. An electrical power system with high voltage protection, comprising:
   a source of alternating current power;
   a direct current load;
   a first controllable rectifying means controlling the flow of power from said source to said load;
   means responsive to a first selected voltage of said load, said means responsive to said first selected voltage controlling said first controllable rectifying means;
   sample and hold means sensitive to a second selected voltage of said load, wherein said second voltage is higher than said first voltage, said sample and hold means connected to prevent the conduction of said first controllable rectifying means for many cycles of the source of alternating current following a voltage output exceeding said second selected level; and wherein
   said means responsive to said first selected voltage is not responsive to the time holding required in said sample and hold means.

2. An electrical power system with high voltage protection, comprising:
   a source of alternating current power;
   a direct current load;
   a first controllable rectifying means controlling the flow of power from said source to said load;
   means responsive to a first selected voltage of said load, said means responsive to said first selected voltage controlling said first controllable rectifying means;
   sample and hold means sensitive to a second selected voltage of said load, wherein said second voltage is higher than said first voltage, said sample and hold means connected to prevent the conduction of said first controllable rectifying means for many cycles of the source of alternating current following a voltage output exceeding said second selected level; and wherein
   said sample and hold means contain a diode to charge a capacitor to a peak voltage related to the maximum voltage across said load.

3. The system recited in claim 2 wherein said capacitor is connected to a discharge resistor and to the gate of a field effect transistor.

4. The system recited in claim 2 further comprising a second controllable rectifying means responsive to a third selected voltage, the third selected voltage being higher than the second selected voltage, and the second controllable rectifying means connected to effectively short circuit the source of alternating current power.

* * * * *